May 20, 1941.

A. F. BENNETT ET AL 2,242,284

MECHANICAL AMPLIFIER

Filed May 14, 1938

INVENTORS: A. F. BENNETT
R. E. POLK
W. L. TUFFNELL

BY

ATTORNEY

Patented May 20, 1941

2,242,284

UNITED STATES PATENT OFFICE 2,242,284

MECHANICAL AMPLIFIER

Arthur F. Bennett, Millburn, N. J., Robert E. Polk, Brooklyn, N. Y., and William L. Tuffnell, Madison, N. J., assignors to Bell Telephone Laboratories, Incorporated, New York, N. Y., a corporation of New York Application May 14, 1938, Serial No. 207,980

3 Claims. (Cl. 179—171)

This invention relates to mechanical amplifiers comprising a microphone element driven by a receiver element and particularly to amplifiers of the type which are suitable for use in portable apparatus such as audiphones.

The object of the invention is to improve the construction and operation of these devices.

When used in an audiphone to be carried or worn by the user, such an amplifier should, of course, be very small and highly efficient and uniformly efficient over the important frequency range. It should be stable in operation, capable of functioning in any position and of simple and rugged construction so as to operate satisfactorily for long periods without adjustment.

In order to keep such devices small enough and light enough in weight to be commercially practical, it has usually been found necessary to sacrifice one or more of the above desirable features. Generally, in order to make the audiphone more readily portable a single battery has been used to energize both the input and output networks of the amplifier. With a single battery circuit the resistance of the battery is common to the output and input networks so that the output variations are fed back to the input circuit. Since the resistance of the battery increases with aging, special precautions must be taken to limit the feedback sufficiently so that the audiphone does not oscillate. In such an audiphone these feedback oscillations usually occur at frequencies below the useful range and may therefore be avoided by designing the amplifier for low efficiency of transmission at such frequencies. This procedure is not a very satisfactory solution, however, for reducing the low frequency response usually also involves considerable sacrifice in output in the important speech band.

In some prior audiphones the direct current component of the pick-up transmitter current has been used to produce the necessary flux for the receiver element of the amplifier. Although, when new, such an amplifier may have a satisfactory output, it gradually falls off as the audiphone is used since the current available for producing flux becomes progressively smaller as the battery deteriorates and the carbon in the pick-up transmitter ages.

In the amplifier of this invention a permanent magnet in the receiver element supplies a flux of such high density that the efficiency of the amplifier is not materially affected by these changes in current through the winding of the receiver element. The receiver and transmitter elements are efficiently coupled by means of a single diaphragm of low mass and stiffness which is responsive to the desired range of frequency. A dome-shaped electrode mounted on the diaphragm and a stationary electrode define for the transmitter element of the amplifier a carbon chamber of such configuration that contact with the carbon is maintained for all operating positions of the amplifier.

Since the diaphragm must be of low mass and stiffness it is necessarily very thin and hence subject to magnetic saturation which impairs the efficiency. According to an important feature of this invention saturation is avoided without sacrificing the advantages of a vibratory system of low mass and stiffness by making the electrode attached to the diaphragm of magnetic material so that it serves both as an electrode for the transmitter element and a path for the flux of the receiver element.

In these amplifiers the heat generated in the carbon chamber by the passage of current through the carbon expands the diaphragm. In order that this expansion will not pack the carbon, make the device insensitive, and unduly increase the drain on the battery, the diaphragm is given an initial bow in the direction away from the carbon element to insure that any further deformation due to heating will always take place in the proper direction.

In some prior designs the gradual expansion of the casing due to heating over an extended period of use stretches the diaphragm radially thereby causing it to deflect and pack the carbon of the transmitter element with a resulting loss in output. According to a further feature of this invention the diaphragm is held in place by the attraction of the magnet of the receiver element and its periphery is left free in a radial sense so that the casing may expand or contract without stressing the diaphragm.

These and other features of the invention will be more clearly understood from the following detailed description and accompanying drawing in which.

Figure 1:
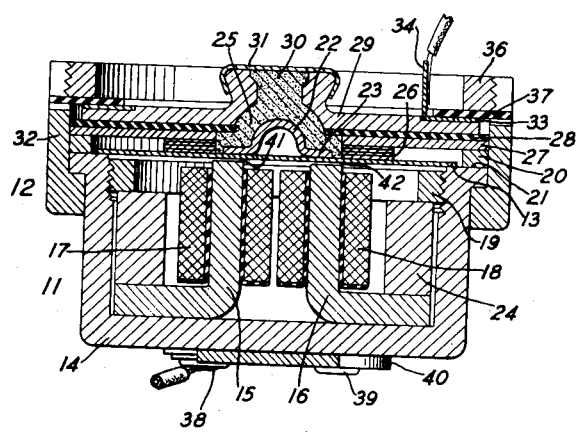
Fig. 1 is a cross-sectional view of an amplifier according to the invention.
Figure 3:
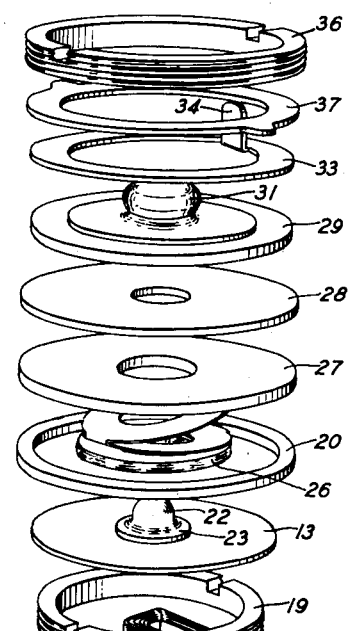
Fig. 3 is an exploded view of the amplifier shown in Fig. 1.
Figure 2:
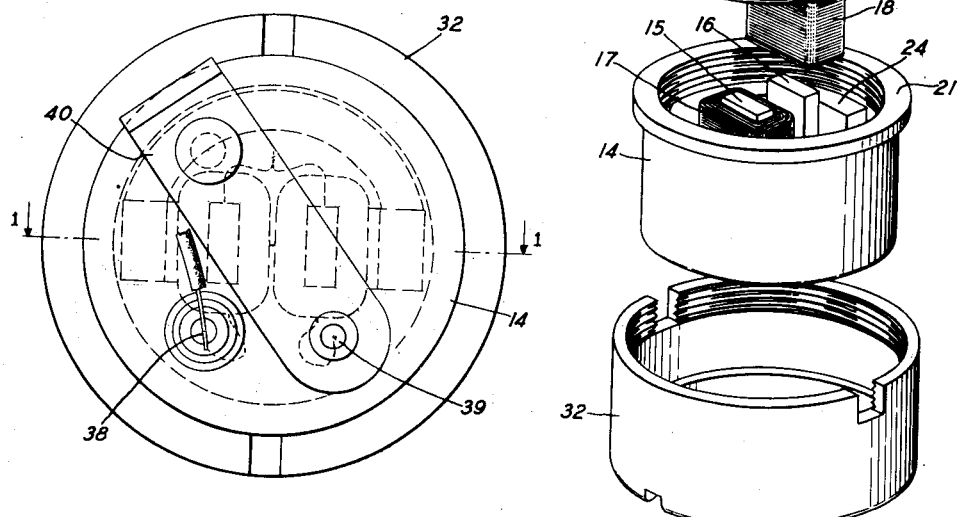
Fig. 2 shows the receiver element end of the amplifier.

Referring now to the drawing, the amplifier shown comprises a receiver element 11 and a transmitter element 12 with a common diaphragm 13. The receiver element is supplied with flux by means of a permanent magnet 24 of a material of high remanence such as Remalloy (an alloy of iron with 12 per cent cobalt and 16 per cent molybdenum) or other good permanent magnet steel. The magnet is U-shaped to fit the casing 14 and is recessed at the poles to receive the horizontal arms of the L-shaped 45 per cent Permalloy pole-pieces 15, 16 on the vertical arms of which are mounted coils 17, 18 for the signal currents to be amplified. This magnet assembly is held in the casing by the brass clamping ring 19.

The diaphragm 13 of 45 per cent Permalloy about .004 inch thick and slightly smaller in diameter than the inside diameter of the brass spacing ring 20, is held against the face 21 of the casing by the magnetic attraction of the pole-pieces 15, 16. Secured to the center of the diaphragm is a dome-shaped Permalloy electrode 22 having a flange 23 opposite the ends of the pole-pieces to provide a low reluctance path and prevent saturation of the diaphragm by the flux set up by the magnet 24. After the electrode has been soldered to the diaphragm the latter is bowed a few thousandths of an inch toward the receiver so that as the diaphragm heats during operation any deformation caused by such heating will be in the same direction rather than toward the carbon chamber 25.

Surrounding the electrode 22 and confining the carbon within the chamber without materially affecting the motion of the diaphragm is an accordion type paper washer 26 held in position by the larger insulating spacers 27, 28 on which is mounted the outer brass electrode 29 of the transmitter element. This outer electrode has a neck portion 30 for filling the chamber 25 and a brass cap 31 for sealing this opening. The electrode is of smaller diameter than the inside of the outer shell 32 and is provided with a brass ring 33 having a terminal lug 34 for connecting the electrode to the external circuit. This transmitter element assembly is held in the casing 32 by the thrust of the brass clamping ring 36 against the insulating washer 37.

The input circuit carrying currents to be amplified is connected to the coils 17 and 18 at the terminals 38, 39 and the transmitter element is connected to the output circuit by means of the terminal lug 34 and a connection to the casing at some convenient point such as terminal 39 on the brass mounting bracket 40. Signal currents flowing in the coils 17 and 18 will modulate the steady flux in the air-gaps 41 and 42 and vibrate the diaphragm 13 in the well-known manner. The vibrations of the electrode 22 on the diaphragm will produce corresponding variations in the conductivity of the carbon particles in the chamber 25 so that the applied signal currents are reproduced in the output circuit with an amplification of the order of 25 decibels.

The most important factor contributing to this high gain is the coupling of the elements by means of a common diaphragm the use of which is made practical by using separate batteries for the two networks and thereby avoiding the feedback difficulties usually encountered in attempting to use this type of efficient coupling.

As the amplifier heats up with use any further deformation of the diaphragm will be in the direction of the receiver unit due to the initial bowing as pointed out above. If the diaphragm were not initially bowed in this manner a rise in temperature with use might cause it to bow toward the chamber 25 thereby compressing the carbon, increasing the drain on the battery in the output circuit and making the carbon less sensitive to the diaphragm vibrations. After a further period of use the heat generated within the amplifier is transmitted to the casing causing it to expand. When this occurs no abnormal tension is placed on the diaphragm since relative movement can occur between the diaphragm and the surface 21. If, on the other hand, it were clamped to the casing in the usual manner it would be tensioned radially thereby reducing the bowing, packing the carbon and materially reducing its sensitivity.

Although the amplifier is intended to be operated with the diaphragm in the vertical plane, it will be apparent that due to the configuration of the chamber 25 the carbon particles will maintain contact with both electrodes when the amplifier is turned into any other position. It is found in practice that even when turned to the most unfavorable position, namely 180 degrees from that in which it is shown, it continues to function with only a moderate decrease in output.

The invention has been described with reference to a particular structure for purposes of illustration, but it will be understood that various modifications may be made within the scope of the following claims.

What is claimed is:

1. A mechanical amplifier comprising a receiver element including a magnet in a magnetic casing, a transmitter element, a common metallic diaphragm for the elements bowed slightly toward the receiver element with its unclamped periphery conductively contacting the casing and maintained in position between the elements by the attraction of the magnet, a magnetic electrode for the transmitter element secured to the diaphragm and forming a path of low reluctance for the flux of the magnet, and means for clamping the elements together in a unitary assembly.

2. In a mechanical amplifier, a non-magnetic casing, a receiver element comprising a thin light weight magnetic diaphragm resting on the casing and free at its periphery so that the casing may expand without stressing the diaphragm, a pair of spaced pole-pieces carrying signal coils and having pole faces adjacent the central portion of the diaphragm and a permanent magnet supplying flux to the pole-pieces of such high density that the efficiency of the element is substantially independent of the normal changes in the steady components of the current in the signal coils, and a transmitter element having a hemispherical carbon chamber and a hemispherical magnetic electrode projecting into the chamber and secured to the diaphragm to form a path of low reluctance between the pole-pieces of the receiver element.

3. In a mechanical amplifier, a receiver element including pole-pieces and a carbon transmitter element having a diaphragm common to the elements and bowed slightly toward the receiver element, and a transmitter electrode of magnetic material secured to the diaphragm opposite the pole-pieces, said electrode being substantially hemispherical in shape to maintain contact with the carbon in the transmitter element for all operating positions of the amplifier and having an outer flange contacting the diaphragm and forming a low reluctance path between the pole-pieces.

ARTHUR F. BENNETT.
ROBERT E. POLK.
WILLIAM L. TUFFNELL.